United States Patent
Bolenbaugh et al.

(10) Patent No.: US 8,718,887 B1
(45) Date of Patent: May 6, 2014

(54) ENERGY BASED TRANSMISSION FRICTION ELEMENT DIAGNOSTIC

(71) Applicant: GM Global Technology Operations LLC, Detroit, MI (US)

(72) Inventors: Jonathan M. Bolenbaugh, Ann Arbor, MI (US); James Sydenstricker, Linden, MI (US); Lawrence A. Kaminsky, White Lake, MI (US); Jy-Jen F. Sah, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/675,010

(22) Filed: Nov. 13, 2012

(51) Int. Cl.
*G06F 7/00* (2006.01)

(52) U.S. Cl.
USPC .......................................................... 701/67

(58) Field of Classification Search
USPC .......... 701/22, 51, 67, 68; 477/5, 7–8, 15, 35, 477/39, 70, 73, 77, 176–181, 906; 192/111.12; 180/65.21, 65.265
See application file for complete search history.

(56) References Cited

U.S. PATENT DOCUMENTS

| | | | |
|---|---|---|---|
| 5,060,770 A * | 10/1991 | Hirano et al. | 477/39 |
| 5,193,060 A * | 3/1993 | Leising et al. | 701/51 |
| 2006/0036359 A1 * | 2/2006 | Thor et al. | 701/67 |
| 2009/0042691 A1 * | 2/2009 | Matsubara et al. | 477/80 |
| 2009/0112427 A1 * | 4/2009 | Heap et al. | 701/67 |
| 2009/0118883 A1 * | 5/2009 | Heap et al. | 701/22 |
| 2010/0063694 A1 * | 3/2010 | Lee et al. | 701/54 |

\* cited by examiner

*Primary Examiner* — Mary Cheung
*Assistant Examiner* — Rodney Butler

(57) ABSTRACT

A method to monitor a torque transfer device configured to transfer torque within an electro-mechanical transmission mechanically-operatively coupled to an internal combustion engine and at least one electric machine includes executing a failure detection strategy in response to a detected slip condition of the torque transfer device. The failure detection strategy includes monitoring a magnitude of energy loss of the torque transfer device. A failure condition in the torque transfer device is detected when the magnitude of energy loss achieves a predetermined energy threshold.

19 Claims, 4 Drawing Sheets

ENERGY BASED TRANSMISSION FRICTION ELEMENT DIAGNOSTIC

TECHNICAL FIELD

This disclosure is related to control systems for electro-mechanical transmissions, and more specifically to detecting failures in torque transfer devices.

BACKGROUND

The statements in this section merely provide background information related to the present disclosure. Accordingly, such statements are not intended to constitute an admission of prior art.

Hybrid powertrain architectures include torque-generative devices, including internal combustion engines and electric machines, which transmit torque through a transmission device to a vehicle driveline. Exemplary electro-mechanical transmissions are selectively operative in fixed gear modes and continuously variable modes through application of torque transfer devices. A fixed gear mode occurs when rotational speed of the transmission output member is a fixed ratio of rotational speed of the input member from the engine, typically due to application of one or more torque transfer devices. A continuously variable mode occurs when rotational speed of the transmission output member is variable based upon operating speeds of one or more electrical machines. The electrical machines can be connected to the output shaft via application of a torque transfer device, or by direct connection. Application of a torque transfer device including a hydraulic clutch is typically effected through a hydraulic circuit, including electrically-actuated hydraulic flow management valves, pressure control solenoids, and pressure monitoring devices controlled by a control module. Application of a torque transfer device including a one-way clutch is typically effected when a driving member is rotating in a first direction in which the one-way clutch has capacity. However, when the driving member is rotating in an opposite or second direction, the one-way clutch will release or decouple the driving member from the driven member or ground.

It is known that torque transfer device slip speeds are determined from motor, engine and output speed signals. As a result of transmission delays, sensor error, and the transient nature of the torque generating speed sources, slip speeds on applied torque transfer devices are often noisy It is further known to detect failures in torque transfer devices when an existing torque transfer device slip speed exceeds a threshold for a predetermined period of time. This failure diagnostic necessitates including the slip performance between large magnitudes of slip speed for a short amount of time and small magnitudes of slip speed for long amounts of time. Typically, the slip speed failure threshold must be set above the typical noise band in the signal to avoid false failures of the diagnostic, resulting in delayed detection of real failures.

SUMMARY

A method to monitor a torque transfer device configured to transfer torque within an electro-mechanical transmission mechanically-operatively coupled to an internal combustion engine and at least one electric machine includes executing a failure detection strategy in response to a detected slip condition of the torque transfer device. The failure detection strategy includes monitoring a magnitude of energy loss of the torque transfer device. A failure condition in the torque transfer device is detected when the magnitude of energy loss achieves a predetermined energy threshold.

BRIEF DESCRIPTION OF THE DRAWINGS

One or more embodiments will now be described, by way of example, with reference to the accompanying drawings, in which.

DETAILED DESCRIPTION

Figure 1:
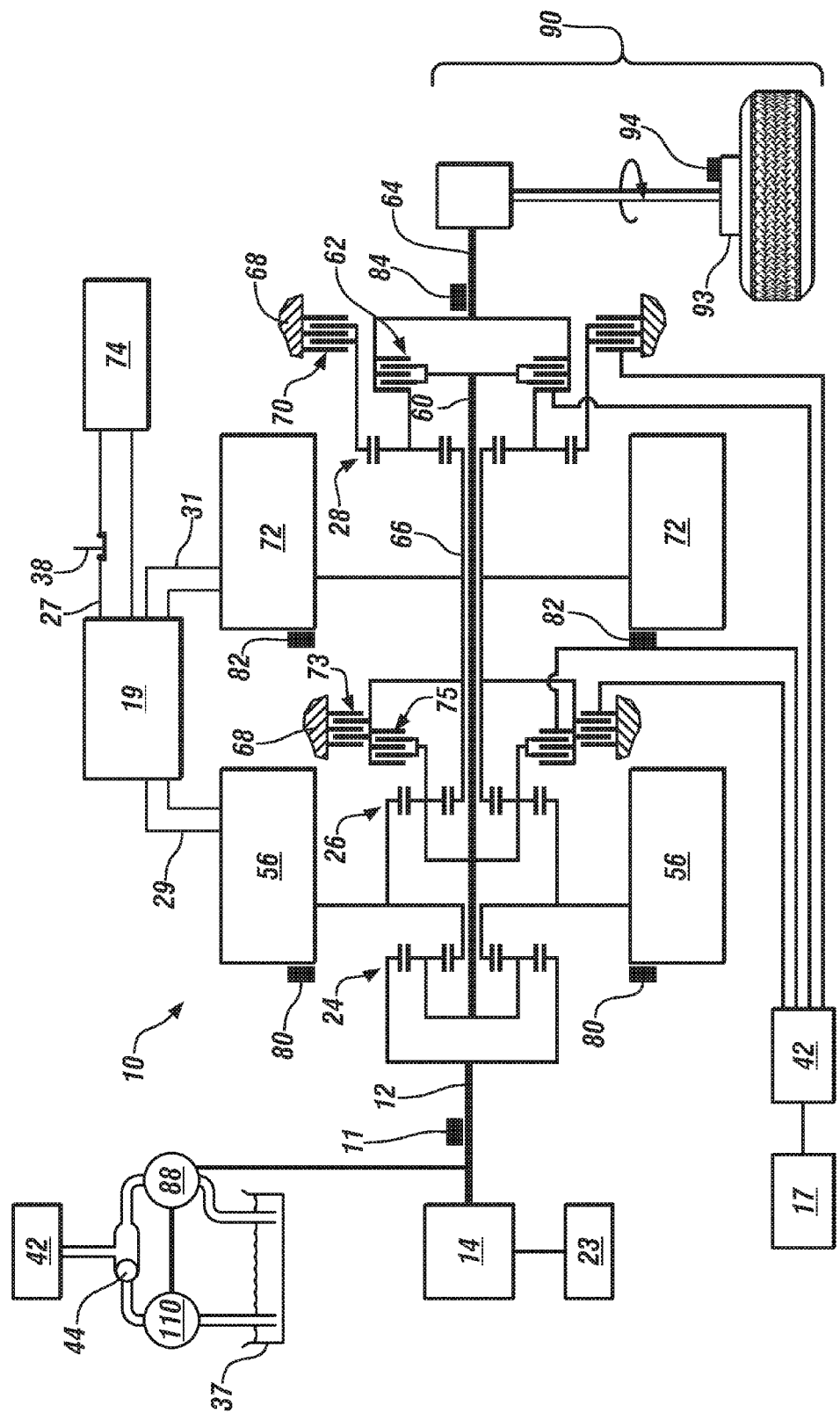
FIG. 1 illustrates an electrically variable transmission of a hybrid powertrain, in accordance with the present disclosure.
Figure 2:
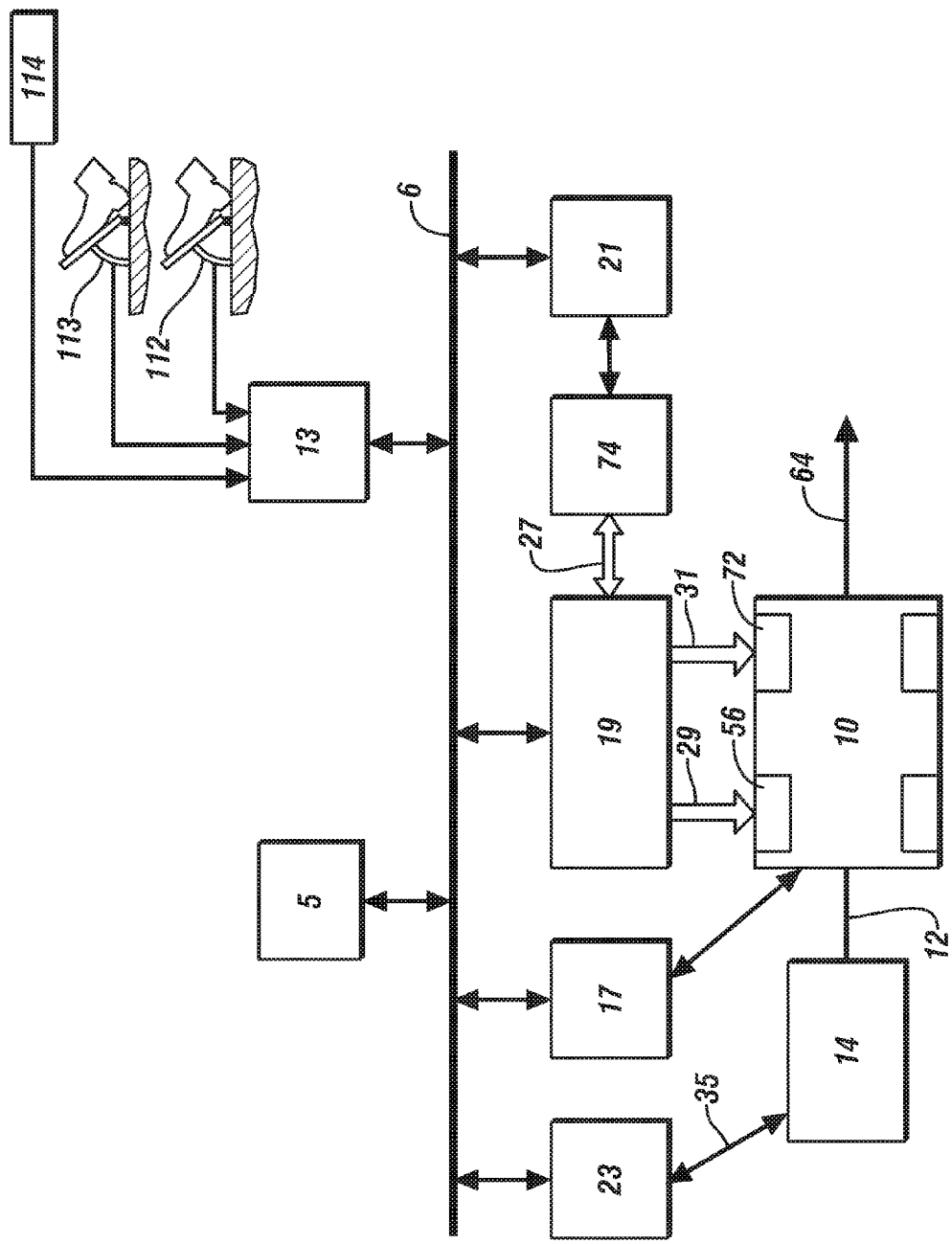
FIG. 2 illustrates an exemplary architecture for a control system of the hybrid powertrain of FIG. 1, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electro-mechanical hybrid powertrain is depicted in FIG. 1 includes a two-mode, compound-split, electro-mechanical hybrid transmission 10 operatively connected to an engine 14 and first and second electric machines (MG-A) 56 and (MG-B) 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The engine 14 includes a multi-cylinder internal combustion engine selectively operative in several states to transmit torque to the transmission 10 via an input shaft 12, and can be either a spark-ignition or a compression-ignition engine. The engine 14 includes a crankshaft operatively coupled to the input shaft 12 of the transmission 10. A rotational speed sensor 11 monitors rotational speed of the input shaft 12. Power output from the engine 14, including rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump and/or a torque management device.

The exemplary transmission 10 includes three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, brakes, selectable one-way clutches and one-way clutches that include mechanical diodes, for example. A hydraulic control circuit 42, preferably controlled by a transmission control module (TCM) 17, is operative to control clutch states of hydraulic clutches and selectable one-way clutches in some instances. One-way clutches including mechanical diodes can simply be engaged and applied when a load is applied to the one-way clutch in the direction the one-way clutch has capacity. Clutches C2 62 and C4 75 preferably include hydraulically-applied rotating friction clutches. Clutches C1 70 and C3 73 preferably include hydraulically-controlled stationary devices that can be selectively grounded to a transmission case 68. Each of the clutches C1 70, C2 62, C3 73, and C4 75 is preferably hydraulically applied, selectively receiving pressurized hydraulic oil via the hydraulic control circuit 42. This disclosure may refer to C1 70, C2 62, C3 73 and C4 75 as "hydraulic clutch devices," however, this transmission 10 is exemplary only, and embodiments discussed herein can be applied to any type of torque transfer device in a transmission that has capacity.

The first and second electric machines 56 and 72 preferably include three-phase AC machines, each including a stator and a rotor, and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably includes a variable reluctance device including a resolver stator and a resolver rotor. The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (TPIM) 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle, to provide output power, e.g., to vehicle wheels 93, one of which is shown in FIG. 1. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS-WHL}$, the output of which is monitored by a control module of a distributed control module system described with respect to FIG. 2, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (ESD) 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters and respective motor control modules configured to receive the torque commands and control inverter states therefrom for providing motor drive or regeneration functionality to meet the commanded motor torques $T_A$ and $T_B$. The power inverters include known complementary three-phase power electronics devices, and each includes a plurality of insulated gate bipolar transistors for converting DC power from the ESD 74 to AC power for powering respective ones of the first and second electric machines 56 and 72, by switching at high frequencies. The insulated gate bipolar transistors form a switch mode power supply configured to receive control commands. Each phase of each of the three-phase electric machines includes one pair of insulated gate bipolar transistors. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The system is a subset of an overall vehicle control architecture, and provide coordinated system control of the exemplary powertrain described in FIG. 1. The distributed control module system synthesizes pertinent information and inputs, and executes routines to control various actuators to achieve control objectives, including objectives related to fuel economy, emissions, performance, drivability, and protection of hardware, including batteries of ESD 74 and the first and second electric machines 56 and 72. The distributed control module system includes an engine control module (ECM) 23, the TCM 17, a battery pack control module (BPCM) 21, and the TPIM 19. A hybrid control module (HCP) 5 provides supervisory control and coordination of the ECM 23, the TCM 17, the BPCM 21, and the TPIM 19. A user interface (UI) 13 is operatively connected to a plurality of devices through which a vehicle operator controls or directs operation of the electro-mechanical hybrid powertrain. The devices include an accelerator pedal 113 (AP) from which an operator torque request is determined, an operator brake pedal 112 (BP), a transmission gear selector 114 (PRNDL), and a vehicle speed cruise control. The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (LAN) bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface (SPI) bus.

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ($T_{O\_REQ}$), a commanded output torque ($T_{CMD}$) to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices and generating and communicating control signals to various solenoids thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules.

The TCM 17 is operatively connected to the transmission 10 and monitors inputs from sensors to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches and selectively actuates pressure control solenoids and shift solenoids of the hydraulic control circuit 42 to selectively actuate the various clutches C1 70, C2 62, C3 73, and C4 75 to achieve various transmission operating range states, as described hereinbelow. One-way clutch devices may employ electrical solenoids, to activate and engage the one-way clutch devices. Further, one-way clutches may be activated and engaged when a load is applied in the direction the one-way clutch has capacity in. Further embodiments that utilize one-way clutch devices can employ hydraulic means to activate and engage the one-way clutch device.

The BPCM 21 is signally connected to sensors to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

The exemplary powertrain selectively operates in one of several operating range states that can be described in terms of an engine state including one of an engine on state (ON) and an engine off state (OFF), and a transmission state including a plurality of fixed gears and continuously variable operating modes, described with reference to Table 1, below.

TABLE 1

| Description | Engine State | Transmission Operating Range State | Applied Clutches | |
| --- | --- | --- | --- | --- |
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON (MI_Eng_On) or OFF (MI_Eng_Off). A second continuously variable mode, i.e., EVT Mode II, or MII, is selected by applying clutch C2 62 only to connect the shaft 60 to the carrier of the third planetary gear set 28. The engine state can be one of ON (MII_Eng_On) or OFF (MII_Eng_Off). For purposes of this description, when the engine state is OFF, the engine input speed is equal to zero revolutions per minute (RPM), i.e., the engine crankshaft is not rotating. A fixed gear operation provides a fixed ratio operation of input-to-output speed of the transmission 10, i.e., $N_I/N_O$, is achieved. A first fixed gear operation (FG1) is selected by applying clutches C1 70 and C4 75. A second fixed gear operation (FG2) is selected by applying clutches C1 70 and C2 62. A third fixed gear operation (FG3) is selected by applying clutches C2 62 and C4 75. A fourth fixed gear operation (FG4) is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. The ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transmit power therebetween to generate a power flow to the output member 64.

FIG. 1 further depicts a schematic diagram of the hydraulic control circuit 42 for controlling flow of hydraulic oil in the exemplary transmission. A main hydraulic pump 88 is driven off the input shaft 12 from the engine 14, and an auxiliary pump 110 controlled by the TPIM 19 to provide pressurized fluid from a sump 37 to the hydraulic control circuit 42 through valve 140. The auxiliary pump 110 preferably includes an electrically-powered pump of an appropriate size and capacity to provide sufficient flow of pressurized hydraulic oil from the sump 37 into the hydraulic control circuit 42 when operational. The hydraulic control circuit 42 selectively distributes hydraulic pressure to a plurality of devices, including the torque-transfer devices including clutches C1 70, C2 62, C3 73, and C4 75, active cooling circuits for the first and second electric machines 56 and 72, and a base cooling circuit for cooling and lubricating the transmission 10 via a plurality of passages 142, 144. As previously stated, the TCM 17 activates the various clutches to achieve one of the transmission operating range states through selective actuation of hydraulic circuit flow control devices including variable pressure control solenoids (PCS) and solenoid-controlled flow management valves. The hydraulic control circuit 42 is only exemplary, and this disclosure is not intended to be limited to any specific configuration.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. The operating range state can be determined by an optimization routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging.

Figure 3:
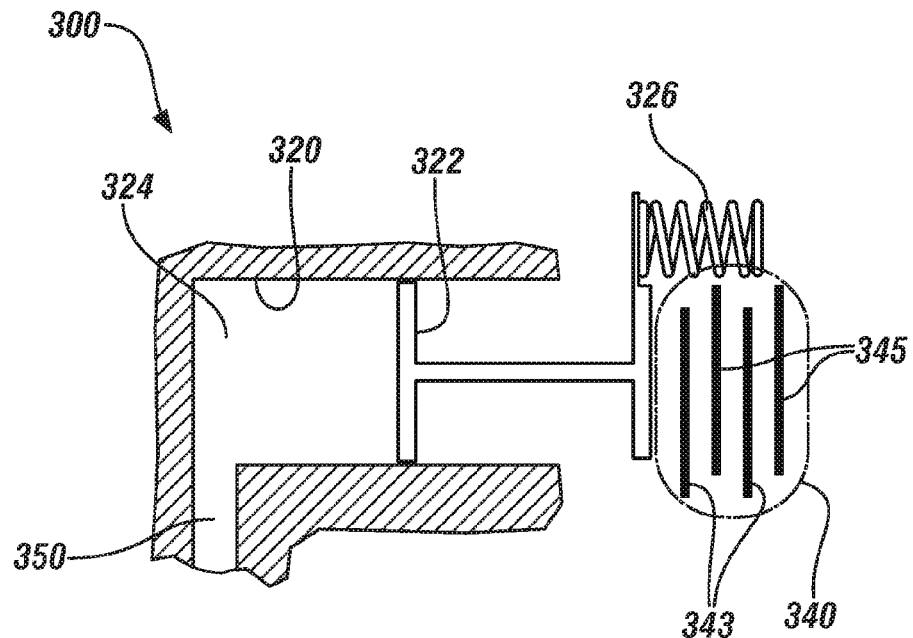
FIG. 3 illustrates an exemplary hydraulically activated clutch device operated to provide a clamping force upon a mechanical clutch, in accordance with the present disclosure.

In an exemplary embodiment, a torque transfer device can include a hydraulic clutch device having capacity in a first direction and in an opposite second direction. A hydraulically activated clutch device utilizes selectively activated pressurized flow of hydraulic fluid to create a desired motion or compression. An exemplary clutch device operates by receiving pressurized hydraulic fluid into a clutch volume chamber. FIG. 3 illustrates an exemplary hydraulically activated clutch device, e.g., hydraulic clutch device, operated to provide clamping force upon a mechanical clutch, in accordance with the present disclosure. Clutch device 300 includes a clutch cylinder 320 and a mechanical clutch 340. Clutch cylinder 320 includes a piston 322 and a clutch volume chamber 324. Pressurized hydraulic fluid at some fill pressure enters clutch volume chamber 324 through hydraulic line 350. Hydraulic line 350 is fluidly connected with a mechanism for selectively applying hydraulic flow, such as an exemplary PCS device. Hydraulic oil in clutch volume chamber 324 exerts pressure upon features within the volume chamber. Piston 322 transforms the fill pressure exerted by the hydraulic fluid into a force. Positive hydraulic pressure is used to fill the clutch volume chamber 324 and move piston 322 in one direction. Return spring 326 is utilized to provide force to move piston 322 in the direction opposite to the direction achieved through the application of pressurized hydraulic fluid.

Mechanical clutch 340 is selectively actuated by the transmission of force through piston 322. The mechanical clutch 340 includes input components 343 and output components 345. When the mechanical clutch 340 is deactivated, unlocked and not applied, the input and output components 343, 345, respectively, are kept separate and are free to rotate independent of one another. When the mechanical clutch 340 is activated, locked and applied, the input and output components 343, 345, respectively, are in frictional contact with one another and rotate in unison.

The input components 343 include connective surfaces in the form of input clutch plates that are mechanically coupled to an oncoming torque providing member. For instance, the oncoming torque providing member can include a member of one of the three planetary gear sets 24, 26 and 28 of FIG. 1. Accordingly, the speed of the input components can be controlled by oncoming torque provided by at least one of first electric machine 56, the second electric machine 72 and the engine 12. The output components 345 include connective surfaces in the form of output clutch plates that are mechanically coupled to a torque receiving output member and can include a member of one of the three planetary gear sets 24, 26 and 28 of FIG. 1. It will be understood that the torque receiving output member is mechanically coupled to the output member 64 of the transmission 10.

In the exemplary embodiment, sensors are located on the crankshaft connected to the engine, providing $N_I$, both electric machines, providing $N_A$ and $N_B$, and the output shaft connected to the driveline, providing $N_O$. Accordingly, rotational speeds of the various members within the transmission are commonly monitored. It will be appreciated that known rotational speeds of known members within the transmission 10 can be utilized to determine the rotational speeds of unknown members within the transmission based on how many degrees of freedom exist within the transmission. In an exemplary embodiment, relative rotational speed across the hydraulic clutch can be determined based on at least one of a monitored rotational speed of the engine, a monitored rotational speed of at least one of the electric machines, and a monitored rotational speed of the output shaft/member. Accordingly, rotational speeds of the input and output components 343, 345, respectively, can be monitored.

Between rotating objects applying a torque, the torque capacity ($T_C$) generated between the input and output components 343, 345, respectively, can be determined in accordance with the following relationship:

$$T_C = \frac{2}{3} * f * F_A \quad [1]$$

wherein f is the coefficient of friction between the rotating objects, and $F_A$ is the axial force applied normal to direction of rotation of the objects.

As will be appreciated by one having ordinary skill in the art, f changes depending upon whether there is relative movement between the two objects. $F_A$ in mechanical clutch 340 is generated by compressive force transmitted through piston 322.

Figure 4:
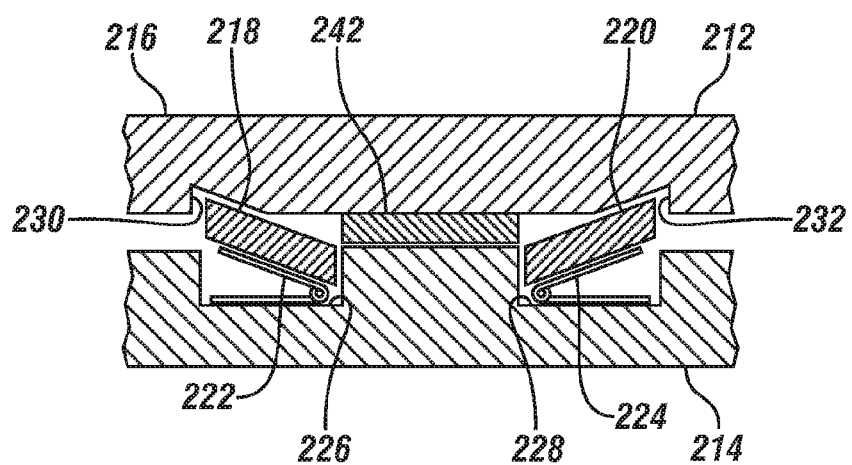
FIG. 4 illustrates a partial cross-sectional view of an exemplary selectable one-way clutch, in accordance with the present disclosure.

In an exemplary embodiment, a torque transfer device can include a selectable one-way clutch device selectively having capacity in at least one of a first direction and in a second opposite direction. Referring to FIG. 4, an exemplary selectable one-way clutch (SOWC) device 12 includes a first and second race 14, 16, respectively, first and second struts 18, 20, respectively; and first and second springs 22, 24, respectively. The first race 14 and second race 16 are configured to selectively either spin relative to each other (i.e., freewheel), or lock-up and rotate as a single unit. The first race 14 defines first and second recessed portions 26, 28, respectively, adapted to selectively retain first and second struts 18, 20, respectively, and first and second springs 22, 24, respectively. The second race 16 defines first and second engagement shoulders 30, 32, respectively each adapted to engage respectively ones of the first and second struts 18, 20, respectively, to lock-up the SOWC device 12. In an exemplary embodiment, relative rotational speed across the SOWC device 12 can be determined based on at least one of a monitored rotational speed of the engine, a monitored rotational speed of at least one of the electric machines, and a monitored rotational speed of the output shaft/member.

When the first and second springs 22, 24, respectively, are in a compressed position, the struts 18, 20 are retracted within the recessed portions 26, 28 of the race 14 such that the shoulders 30, 32 are not engaged and the clutch 12 freewheels in both first and second directions. When the first and second springs 22, 24, respectively are in an extended position, the struts 18, 20 protract from their respective recessed portions 26, 28, and engage the first and second engagement shoulders 30, 32, respectively, such that the clutch 12 locks-up in both clockwise and counter-clockwise directions. Additionally, by compressing one of the springs 22, 24 and extending the other, the SOWC device 12 can be locked-up in one direction and freewheel in the opposite direction.

The springs 22, 24 are configured to push the struts 18, 20 into engagement with the shoulders 30, 32 such that in the steady state position the SOWC device 12 is locked-up in both directions. Therefore, for purposes of releasing the SOWC device 12, a selector plate 42 is provided. The selector plate is adapted to selectively translate and engage one of the struts 28, 20 such that the engaged strut is pushed toward its respectively recessed portion 26, 28 and out of engagement with its respective shoulder 30, 32. As an example, the selector plate 42 may be translated into engagement with strut 18 thereby compressing the spring 22 and retracting the strut 18 out of engagement with the shoulder 30 such that race 16 is rotatable in a first direction relative to race 14. Conversely, the selector plate 42 may be translated into engagement with strut 20 thereby compressing the spring 24 and retracting the strut 20 out of engagement with the shoulder 32 such that race 16 is rotatable in a second direction relative to race 14.

Embodiments are further envisioned where the SOWC 12 can be adapted to only have capacity in one of the first and second directions and always permitted to freewheel in the second opposite direction. For instance, the second strut 20, the second spring 24, the second recessed portion 228, and the second engagement shoulder 232 can be omitted to always permit rotation in the second direction. Contrarily, the first strut 218, the first spring 222, the first recessed portion 226, and the first engagement shoulder 232 can be omitted to always permit rotation in the first direction. The selector plate 242 can be included to selectively allow freewheeling in both directions. In embodiments when the selector plate 42 is not included, the SOWC 12 simply becomes a one-way clutch only having capacity in one of a first and second direction and permitted to freewheel in the other one of the first and second direction. In one embodiment, only one of the first and second races 214, 216, respectively, is rotating while the other one of the first and second races 214, 216, respectively is a stationary element, e.g., the ground or transmission housing.

Figure 5:
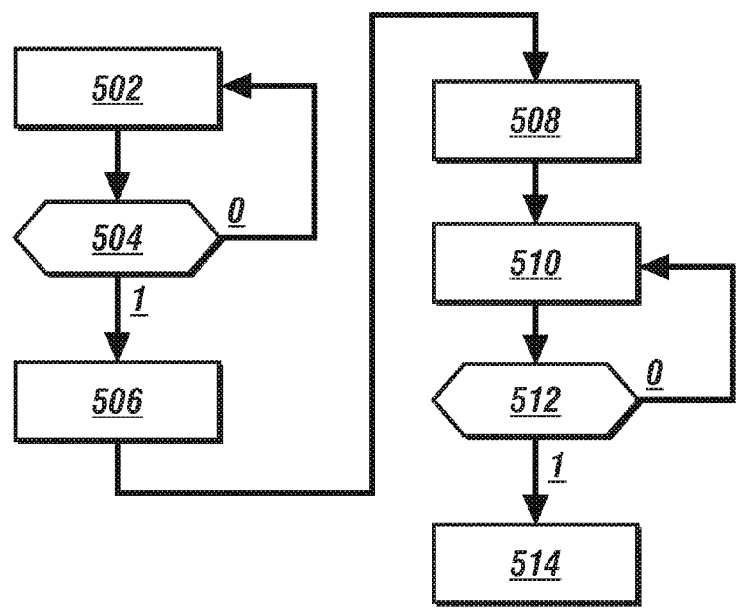
FIG. 5 illustrates a flowchart for detecting a failure condition in a torque transfer device, in accordance with the present disclosure.

A failure detection strategy can be utilized for any type of friction torque transfer device including hydraulically-applied rotating friction clutches, hydraulically-controlled stationary devices, single or compound plate clutches or packs, band clutches, brakes, selectable one-way clutch devices and one-way clutch devices that include mechanical diodes, for example. FIG. 5 illustrates a flowchart for executing a failure detection strategy when a slip condition of a torque transfer device is detected when the torque transfer device is applied, activated and engaged. It will be appreciated that the flowchart can be implemented within either of the TCM 17 or the HCP 5 illustrated in FIGS. 1 and 2. Table 2 is provided as a key to FIG. 5, wherein the numerically labeled blocks and the corresponding functions are set forth as follows.

TABLE 2

| BLOCK | BLOCK CONTENTS |
|---|---|
| 502 | Monitoring slip speed across a torque transfer device. |
| 504 | Does a magnitude of the slip speed across the torque transfer |

TABLE 2-continued

| BLOCK | BLOCK CONTENTS |
|---|---|
| | device exceed a rotational speed threshold and is the monitored slip speed in a direction the torque transfer device has capacity in? |
| 506 | Detecting a slip condition. |
| 508 | Executing a failure detection strategy when the slip condition is detected. |
| 510 | Monitoring a magnitude of power loss of the torque transfer device. |
| 512 | Does the magnitude of power loss over time achieve a predetermined energy threshold? |
| 514 | Detecting a failure condition |

The flowchart of FIG. 5 begins at block 502, wherein slip speed across the torque transfer device is monitored when the torque transfer device is applied, activated or otherwise engaged. The slip speed across the torque transfer device includes monitoring relative rotational speed across the torque transfer device, e.g., monitoring rotational speed between input and output components of the torque transfer device. As described above, known rotational speeds of known members within the transmission 10 can be utilized to determine the rotational speeds of unknown members within the transmission based on how many degrees of freedom exist within the transmission. Thus, the relative rotational speed across the torque transfer device can be determined based on at least one of a monitored rotational speed of the engine, a monitored rotational speed of at least one of the electric machines, and a monitored rotational speed of the output shaft/member.

Decision block 504 nest determines if a magnitude of the slip speed across the torque transfer device exceeds a rotational speed threshold and if the monitored slip speed is in a direction the torque transfer device has capacity in. The rotational speed threshold may be zero. The rotational speed threshold may be a non-zero number selected to avoid detecting false slip conditions due to noise. In embodiments when the torque transfer device includes a one-way clutch device, the one-way clutch device only has capacity in one direction and is permitted to freewheel in an opposite direction. In embodiments when the torque transfer device includes the selectable one-way clutch device, the selectable one-way clutch device selectively has capacity in at least one of a first direction and in a second opposite direction. Thus, the selectable one-way clutch may only have capacity in one of the first and second directions. In embodiments when the torque transfer device includes the hydraulic clutch device, the hydraulic clutch device has capacity in both the first and the opposite second directions. A "1" denotes a "yes", i.e., the magnitude of the slip speed across the torque transfer device exceeds the rotational speed threshold and the monitored slip speed is in the direction the torque transfer device has capacity in. Accordingly, the flowchart of FIG. 5 proceeds to block 506. A "0" denotes a "no", i.e., at least one of the magnitude of the slip speed across the torque transfer device does not exceed the rotational speed threshold and the slip speed is not in a direction the torque transfer device has capacity in. Accordingly, the flowchart of FIG. 5 reverts back to block 502.

Referring to block 506, a slip condition is detected. Thus, the slip condition is detected if the magnitude of the monitored slip speed is in a direction the torque transfer device has capacity in and exceeds the rotational speed threshold. In embodiments when the torque transfer device includes the one-way clutch device or the selectable one-way clutch device only having capacity in one direction, the slip condition is never detected if the monitored relative rotational speed across the one-way clutch device is in the opposite second direction. In other words, the slip condition is never detected if the monitored slip speed is in a direction the torque transfer device is not intended to have capacity in. Doing so would result in detecting slip conditions where freewheeling is permitted, and therefore, could result in false detection of failure conditions in the torque transfer device.

Referring to block 508, a failure detection strategy is executed when the slip condition is detected. Executing the failure condition strategy includes monitoring a magnitude of power loss of the torque transfer device in block 510. The magnitude of power loss of the torque transfer device can be expressed as follows.

$$P = \text{Slip speed} \times \text{Maximum capacity} \quad [2]$$

wherein P is the magnitude of power loss,
Slip speed is the relative rotational speed across the torque transfer device, and
Maximum capacity is the maximum capacity of the torque transfer device.

Therefore, the magnitude of power loss of the torque transfer device is determined based on the monitored relative rotational speed and the maximum capacity of the torque transfer device. In a non-limiting embodiment, slip speed is expressed in rpm and the maximum capacity is expressed in Newton-meters (Nm). Further, the magnitude of energy loss of the torque transfer device can be determined and monitored based on integrating the magnitude of power loss. Integrating the magnitude of power loss to determine the magnitude of energy loss of the torque transfer device can be expressed as follows.

$$E = \int P dt \quad [3]$$

wherein E is the magnitude of energy loss, and
P is the magnitude of power loss.

Therefore, the magnitude of energy loss of the torque transfer device is the magnitude of the power loss of the torque transfer device over time. In a non-limiting embodiment, the P is expressed in Nm-rpm and the E is expressed in joules (J).

Decision block 512 next determines if the magnitude of power loss over time, i.e., magnitude of energy loss, achieves a predetermined energy threshold. The predetermined energy threshold can correspond to a maximum energy limit the torque transfer device can achieve before a failure results. In a non-limiting embodiment, the predetermined energy threshold is 5,000 J. A "0" denotes a "no", i.e., the magnitude of power loss over time does not achieve the predetermined energy threshold and the flowchart reverts back to block 510. A "1" denotes a "yes", i.e., the magnitude of power loss over time achieves the predetermined energy threshold and the flowchart proceeds to block 514.

Referring to block 514, a failure condition is detected in the torque transfer device. Simply put, the failure condition in the torque transfer device is detected if the magnitude of power loss over time, i.e., the magnitude of energy loss, achieves the predetermined threshold. Block 514 can be configured to activate a diagnostic alert warning the operator of the vehicle or the TCM 17 that the failure condition is detected in the torque transfer device. Likewise, operation of the torque transfer device can be terminated in response to the detected failure condition in order to prevent hardware damage.

As mentioned above, existing diagnostics detect failures in torque transfer devices when an existing torque transfer device slip speed exceeds a threshold for a predetermined period of time. This failure diagnostic necessitates including the slip performance between large magnitudes of slip speed for a short amount of time and small magnitudes of slip speed for long amounts of time. Typically, the slip speed failure threshold must be set above the typical noise band in the signal to avoid false failures of the diagnostic, resulting in delayed detection of real failures. Table 3 is provided to illustrate the time in seconds it takes a torque transfer device having a maximum capacity of 250 Nm to achieve a maximum energy limit of 5,000 J for varying clutch slip speeds.

TABLE 3

| Slip Speed (rpm) | Maximum Capacity (Nm) | Time (s) | Energy Limit (J) |
|---|---|---|---|
| 50 | 250 | 3.80952381 | 5,000 |
| 100 | 250 | 1.904761905 | 5,000 |
| 250 | 250 | 0.761904762 | 5,000 |
| 500 | 250 | 0.380952381 | 5,000 |

Table 3 illustrates if time calibrations for the existing failure diagnostic were set to 1.0 seconds to avoid false failures, any sustained slip speed above 200 rpm may damage the clutch in the maturation time of the existing diagnostic. However, with the energy based diagnostic described with reference to the flowchart of FIG. 5, Table 3 depicts the energy based diagnostic can mature in the time shown in table 3 to detect real failures at low slip speeds and to detect real failures at high slip speeds in faster times.

Figure 6:
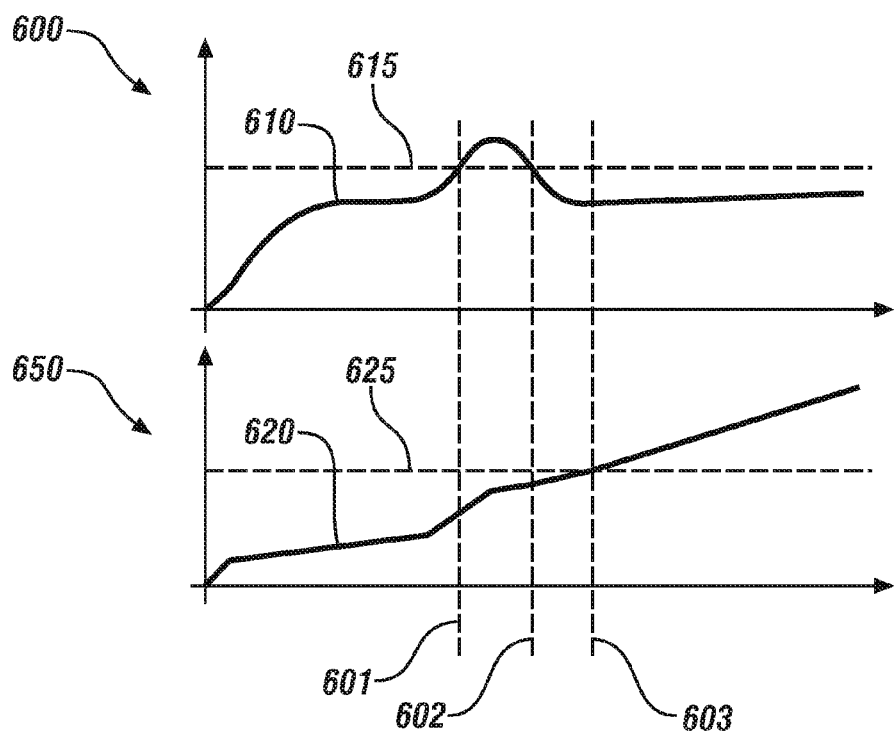
FIG. 6 illustrates an exemplary plot representing a slip speed profile and an energy loss profile of a torque transfer device, in accordance with the present disclosure.

FIG. 6 illustrates an exemplary plot 600 representing a slip speed profile 610 and an exemplary plot 650 describing an energy loss profile 620 of a torque transfer device in accordance with the present disclosure. The plots 600, 650 contain experimental and derived data for detecting a failure condition in a torque transfer device when a slip condition has been detected. The plots 600, 650 are described with reference to the electro-mechanical hybrid powertrain of FIG. 1 and the flowchart of FIG. 5. The horizontal axis in both plots 600, 650 denotes time in seconds. Each dashed vertical line 601, 602603 denotes a respective point in time during the detected slip condition.

Referring to plot 600, the vertical axis denotes slip speed in rpm. The monitored slip speed across the torque transfer device over time is denoted by the slip speed profile 610. As aforementioned, block 502 monitors slip speed across the torque transfer device. It will be assumed that decision block 504 is satisfied, e.g., the magnitude of the slip speed exceeds a rotational speed threshold and is monitored slip speed is in a direction the torque transfer device has capacity in. Dashed horizontal line 615 denotes a slip speed failure threshold.

Referring to plot 650, the vertical axis denotes energy in joules (J). A monitored magnitude of energy loss of the torque transfer device is denoted by the energy loss profile 620. As aforementioned, block 510 of the flowchart of FIG. 5 can determine and monitor the magnitude of energy loss utilizing Equations [2] and [3]. Dashed horizontal line 625 denotes a predetermined energy threshold.

Just prior to dashed vertical line 601, the slip speed profile 610 increases, and at dashed vertical line 601, achieves the slip speed failure threshold at dashed horizontal line 615. The slope of the energy loss profile 620 increases in response to the increase in slope of the slip speed profile 610.

The slip speed profile 610 exceeds the slip speed failure increases until a time between dashed vertical lines 601 and 602 and then decreases. The slope of the energy loss profile 620 decreases in response to the decrease in slope of the slip speed profile at the time between dashed vertical lines 601 and 602. At dashed vertical line 602, the decreasing slip speed profile 610 meets the slip speed failure threshold at dashed horizontal line 615, and proceeds to decrease below the slip speed failure threshold before stabilizing at a constant slip speed below the slip speed failure threshold, e.g., below dashed horizontal line 615. However, the energy loss profile 620 continues to increase beyond dashed vertical line 602.

In this non-limiting example, the slip speed (i.e., as denoted by the slip speed profile 610) does not exceed the slip speed failure threshold for a predetermined period of time between dashed vertical lines 601 and 602. Therefore, a failure condition is not detected in the torque transfer device.

At dashed vertical line 603, the energy loss profile 620 achieves the predetermined energy threshold at dashed horizontal line 625. In a non-limiting example, the predetermined energy threshold is equal to 5,000 J. When a magnitude of energy loss (e.g., energy loss profile 620) achieves the predetermined energy threshold, the failure condition in the torque transfer device is detected.

It will be appreciated that existing failure detection diagnostics for torque transfer devices detect failures when the slip speed exceeds the slip speed failure threshold for the predetermined period of time. Plot 600 demonstrates that no failure would be detected for the torque transfer device because the time (e.g., between dashed vertical lines 601 and 602) that the slip speed exceeds the slip speed failure threshold is less than the predetermined period of time, wherein the predetermined period of time is selected to be above a noise band to avoid false failures. However, plot 650 demonstrates that a failure condition is detected for the torque transfer device at dashed vertical line 603 because the magnitude of energy loss achieves the predetermined energy loss threshold. Thus, hardware damage to the torque transfer device can be prevented due to the detection of the failure condition utilizing the energy based approach/diagnostic.

Embodiments envisioned include utilizing the exemplary method of detecting the failure condition of the torque transfer device using the energy based approach/diagnostic as described above with reference to the flowchart of FIG. 5 in conjunction with the existing diagnostics to detect failures in torque transfer devices to provide a more accurate method of detecting failure conditions in slipping torque transfer devices. For instance, the relative rotational speed, e.g., slip speed, across the torque transfer device can be compared to a rotational speed failure threshold, e.g., slip speed failure threshold. The failure condition in the torque transfer device can be detected when at least one of the magnitude of energy loss of the torque transfer device achieves the predetermined energy threshold, and the relative rotational speed across the torque transfer device exceeds the rotational speed failure threshold for at least a predetermined period of time. In one embodiment, the rotational speed failure threshold for the existing diagnostic is set high while the predetermined period of time is set low to trigger quick detection of failures in the torque transfer device when the magnitude of slip speed is high. The energy based diagnostic can be configured to detect failures when a relatively low slip speed is detected for a long period of time.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to monitor a torque transfer device within an electro-mechanical transmission mechanically-operatively coupled to an internal combustion engine and at least one electric machine, said torque transfer device configured to transfer torque through the electro-mechanical transmission to an output member, comprising:
  executing in a control module the following steps:
    monitoring slip speed across the torque transfer device;
    detecting a slip condition when a magnitude of the monitored slip speed is in a direction in which the torque transfer device has capacity and exceeds a rotational speed threshold;
    executing a failure detection strategy when the slip condition is detected comprising:
      comparing the slip speed across the torque transfer device to a slip speed failure threshold;
      monitoring a magnitude of power loss of the torque transfer device; and
      even if the slip speed across the torque transfer device does not exceed the slip speed failure threshold for a predetermined period of time, detecting a failure condition in the torque transfer device when the magnitude of power loss over time achieves a predetermined energy threshold.

2. The method of claim 1, wherein the magnitude of power loss is based on a maximum capacity of the torque transfer device and the monitored slip speed.

3. The method of claim 1, wherein the rotational speed threshold is equal to one of zero and a non-zero integer, the non-zero integer selected to avoid false slip speed conditions resulting from noise.

4. The method of claim 1, wherein monitoring slip speed across the torque transfer device comprises monitoring a relative rotational speed between input and output components of the torque transfer device.

5. The method of claim 4, wherein the relative rotational speed between the input and output components of the torque transfer device is based on at least one of a monitored rotational speed of the engine, a monitored rotational speed of said at least one electric machine and a monitored rotational speed of the output member.

6. The method of claim 1, wherein the torque transfer device comprises a hydraulic clutch device having capacity in a first direction and in a second opposite direction.

7. The method of claim 1, wherein the torque transfer device comprises a selectable one-way clutch device selectively having capacity in at least one of a first direction and a second opposite direction.

8. The method of claim 1, wherein the torque transfer devices comprises a one-way clutch device only having capacity in one direction and permitted to freewheel in an opposite direction.

9. The method of claim 1 further comprising:
  never detecting the slip condition if the monitored slip speed is in a direction the torque transfer device is not intended to have capacity in.

10. The method of claim 1 further comprising:
  detecting the failure condition in the torque transfer device when the slip speed across the torque converter device exceeds the slip speed failure threshold for at least the predetermined period of time.

11. Method to monitor a torque transfer device configured to transfer torque within an electro-mechanical transmission mechanically-operatively coupled to an internal combustion engine and at least one electric machine, comprising:
  executing in a control module the following steps:
    monitoring a relative rotational speed across the torque transfer device; and
    in response to a detected slip condition of the torque transfer device when the torque transfer device is applied, executing a failure detection strategy comprising:
      comparing the relative rotational speed across the torque transfer device to a rotational speed failure threshold,
      monitoring a magnitude of energy loss of the torque transfer device, and
      even if the relative rotational speed across the torque transfer device does not exceed the rotational speed failure threshold for a predetermined amount of time, detecting a failure condition in the torque transfer device when the magnitude of energy loss achieves a predetermined energy threshold.

12. The method of claim 11, wherein monitoring the magnitude of energy loss of the torque transfer device comprises:
  determining a power loss of the torque transfer device based on the monitored relative rotational speed across the torque transfer device and a maximum capacity of the torque transfer device; and
  integrating the power loss of the torque transfer device to determine the energy loss of the torque transfer device.

13. The method of claim 11, wherein monitoring the relative rotational speed across the torque transfer device comprises:
  monitoring rotational speed of the engine;
  monitoring rotational speed of the at least one electric machine;
  monitoring rotational speed of an output member of the electro-mechanical transmission; and
  determining the relative rotational speed across the torque transfer device based on at least one of the monitored rotational speeds of the engine, the at least one electric machine and the output member.

14. The method of claim 11, wherein the torque transfer device comprises a one-way clutch device only having capacity in one direction and permitted to freewheel in an opposite direction, and wherein said detected slip condition is detected by:
  detecting the slip condition of the one-way clutch device if a magnitude of the relative rotational speed across the one-way clutch device exceeds a rotational speed threshold when the monitored relative rotational speed is in the one direction.

15. The method of claim 14 further comprising:
  never detecting the slip condition of the one-way clutch device if the monitored relative rotational speed across the one-way clutch device is in the opposite direction.

16. The method of claim 11, wherein the torque transfer device comprises a selectable one-way clutch device selectively having capacity in at least one of a first direction and in a second opposite direction, and wherein said detected slip condition is detected by:
  detecting the slip condition of the selectable one-way clutch device if a magnitude of the relative rotational speed across the torque transfer device exceeds a rotational speed threshold when the monitored relative rotational speed is in one of the first and second directions in which the selectable one-way clutch device has capacity.

17. The method of claim 11, wherein the torque transfer device comprises a hydraulic clutch device having capacity in a first direction and in a second opposite direction, and wherein said detected slip condition is detected by:

detecting the slip condition of the hydraulic clutch device if a magnitude of the relative rotational speed across the hydraulic clutch device exceeds a first rotational speed threshold.

18. The method of claim 11 further comprising:
activating a diagnostic alert if the failure condition is detected.

19. The method of claim 11 further comprising:
detecting a failure condition in the torque transfer device when at least one of:
   the magnitude of energy loss of the torque transfer device achieves the predetermined energy threshold, and
   the relative rotational speed across the torque transfer device exceeds the rotational speed failure threshold for at least the predetermined period of time.

* * * * *